United States Patent [19]
Quinn

[11] Patent Number: 5,252,001
[45] Date of Patent: Oct. 12, 1993

[54] OIL SPILL INFLATABLE BARRIER

[76] Inventor: Kenneth Quinn, P.O. Box 784, Pearland, Tex. 77581

[21] Appl. No.: 808,889

[22] Filed: Dec. 18, 1991

[51] Int. Cl.$^5$ ............................................. E02B 15/04
[52] U.S. Cl. ........................................ 405/68; 405/63; 405/64
[58] Field of Search ........................ 405/63, 64, 66–70

[56] References Cited

U.S. PATENT DOCUMENTS

| | | | |
|---|---|---|---|
| 3,494,132 | 2/1970 | Logan | 405/68 |
| 3,503,214 | 3/1970 | Desty et al. | 405/68 |
| 3,783,622 | 1/1974 | Gambel | 405/66 X |
| 4,112,689 | 9/1978 | Webb | 405/63 |
| 4,140,424 | 2/1979 | Bretherick et al. | 405/68 |
| 4,342,655 | 8/1982 | Webb | 405/63 X |
| 4,993,871 | 2/1991 | Lundin | 405/68 |
| 5,064,310 | 11/1991 | Sullivan | 405/69 |

FOREIGN PATENT DOCUMENTS

| | | | |
|---|---|---|---|
| 3810493 | 3/1989 | Fed. Rep. of Germany | 405/68 |
| 9108348 | 6/1991 | World Int. Prop. O. | 405/63 |

*Primary Examiner*—Dennis L. Taylor
*Assistant Examiner*—John Ricci
*Attorney, Agent, or Firm*—David M. Ostfeld

[57] ABSTRACT

An apparatus for containing oil spills or the likes in a body of water. The apparatus is formed of high strength lightweight plastic material. The apparatus is filled by air and water so as to automatically move to a vertical position in the body of contaminated water and provide a barrier to contain an oil spill. The barrier uses water as ballast.

2 Claims, 1 Drawing Sheet

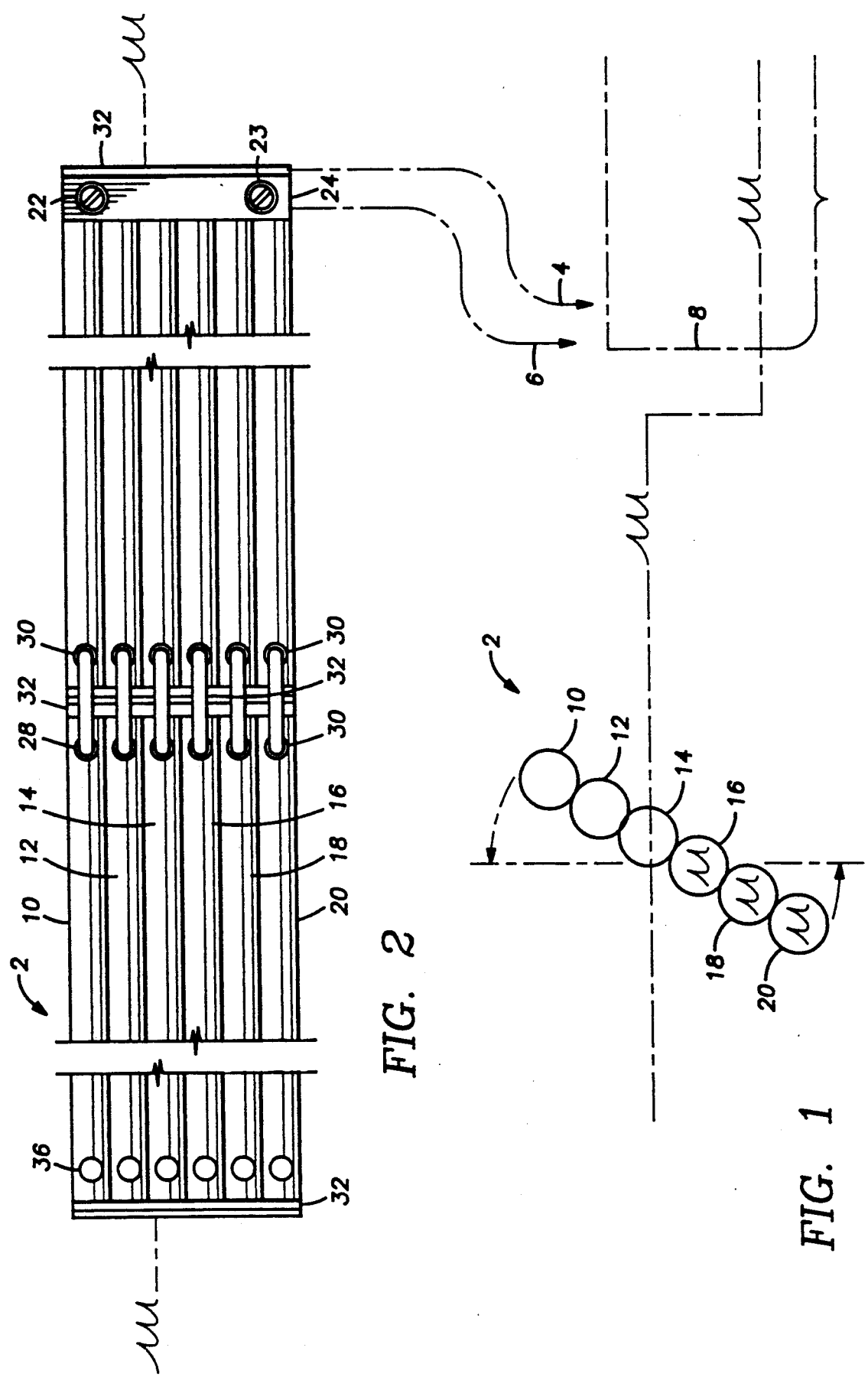

OIL SPILL INFLATABLE BARRIER

BACKGROUND OF THE INVENTION

This invention relates to flotation type barriers used to contain oil spills, and more particularly, to lightweight inexpensive, disposable inflatable barriers.

DESCRIPTION OF PRIOR ART

Heretofore various types of floating barriers employed the use of wood logs, lengths of wood planks, sealed drums, sections of the barrier that were inflated and plastic foam materials used to float the lower suspended barrier curtain. However such prior art flotation means have not been constructed of such type of materials which could be considered to be disposable yet sufficently strong as to be able to be deployed, contain the oil spill and then economically be disposed rather than being cleaned for later use.

The following list of patents were searched in this art class U.S. Pat. Nos.
3,613,377 Zaugg
3,921,407 Neal
4.123,911 Finbigan
4,295,755 Meyers
3,567,019 Headrick
3,701,258 Rhodes
3,563,036 Smith As my invention discloses a simple, inexpensive inovative design it will become apparent to the reader that the objects specifications and drawings describe an improved flotation type oil spill containment barrier which can be disposed of after its effective use.

OBJECTS OF THE INVENTION

An object of my invention is to provide an inflatable type barrier comprised of a plurality of longitudinal cells, so formed as to adjoin one another for a given length, formed from a high strength, high puncture resistant, lightweight plastic material.

Another object of my invention is to provide a simple valved manifold controlling the entrance of air or water ballast to the pre selected longitudinal cells.

Yet another object of my invention is to provide barrier sections of various lengths with a means to connect a plurality of sections so as to produce the required length to contain any given size oil spill.

Another object of my invention is to provide quick connect type fittings and hoses allowing a plurality of sections to be rapidly assembled and put in place around the oil spill.

Additionally an object of my invention is to provide an inflatable type barrier when properly filled with air and water in the pre selected cell sections, is self erecting to a vertical position in a body of water thereby producing a floating vertical wall with internally contained water ballast.

Accordingly the present invention provides an improved inexpensive, lightweight, disposable oil spill barier. The scope of this invention should not be limited to the containment of oil only but to provide a means to contain any type surface floating fluid contamination.

DESCRIPTION OF THE DRAWINGS

FIG. 1 illustrates the barrier in a cross sectional view. The relative position describing the self erecting action of the cell structure.

FIG. 2 illustrates the barrier in the vertical position configured such as to contain contaminated floating fluids on the surface of the body of water.

OPERATION OF THE INVENTION

As the barrier sections of various lengths may be stored in on board containers or reels for deployment, the vessel transporting an oil product may rapidly deploy the lightweight plastic barrier as required when a spill takes place. The sections simply connected together, with the quick connect fittings and hoses. As this operation is in process the mechanical coupling such as by a thermal welding process producing a sufficiently strong apparatus to withstand water current forces is secured, attaching the end of the leading barrier section to the head section of the following section and repeating the procedure as the sections are deployed overboard.

Refering to FIG. 1, would illustrate the barrier,2 being pumped full, with the air hose, 4 and the water hose, 6 both the pumps being located on the vessel, 8 as the pre selected cells, 10,12,14,16,18 and 20 are filled the barrier, 2, begining to erect itself to a vertical position. This height above the surface of the water being determined by the selection of the valves, 22 and 23 located on the manifold,24.

As the proper amount of air and water is determined by the person deploying the barrier and operating the air/water pumps and valves, the appropriate valves are closed and the barrier 2, is now in a vertical position ready to contain the oil spill.

Refering to FIG. 2 the hoses,28 and fittings 30 are shown connecting the sections together along with the mechanical coupling, 32. Plugs,36 are used only in the end section of the barrier.

Again refering to FIG. 2 the valve, 22 controls the flow and on/off condition of the top three cells,10,12 and 14. The valve positions being such that air or water may be pumped into these cells. Valve,23 operates the same allowing water or air to be pumped into the lower cells 16,18 and 20.

With this combination of valve control the barrier,2 may be raised or lowered in respect to the surface of the water simply by having more cells containing air and fewer containing water ballast, and the reverse of this configuration, allows this novel feature.

I claim:

1. An inflatable type barrier using an air and water supply for the containment of spills of contaminating liquids floating on the surface of a body of water, comprised of:
    a. a plurality of longitudinal, adjacent cells;
    b. a valued manifold providing a means to control the introduction of air or water to individual cells;
    c. a quick connecting hose coupling apparatus having a means to connect said plurality of cells for providing the air and water supply to each cell;
    d. said plurality of longitudinal cells attached to one another sufficiently to withstand current forces of the water; and
    e. said valved manifold including means for introduction of air and water ballast through said coupling apparatus after said cells are in the water.

2. An inflatable type barrier using an air and water supply for the containment of spills of contaminating liquids floating on the surface of a body of water, comprised of:

a. a removably attached manifold having an air valve and a water valve;
b. a first barrier section including a first set of cells;
c. a second barrier section attached below said first barrier section to said first barrier section, said second barrier section including a second set of cells; and
d. said manifold removably attached to said first section and said second section and having means for selectively filling said cells through said air valve and said water valve to change position of said barriers from lying horizontally on the surface of the water to being vertical in the water with a portion of said cells above the water.

* * * * *